July 17, 1962

L. W. BALLARD ET AL 3,045,106

MOBILE WELDING APPARATUS AND METHOD

Filed Dec. 19, 1960

INVENTORS
LOUIE W. BALLARD
MARTIN E. O'DOR

BY

ATTORNEY

INVENTORS
LOUIE W. BALLARD
MARTIN E. O'DOR
BY
ATTORNEY

INVENTORS
LOUIE W. BALLARD
MARTIN E. O'DOR
BY
ATTORNEY

INVENTORS
LOUIE W. BALLARD
MARTIN E. O'DOR

ATTORNEY

United States Patent Office 3,045,106
Patented July 17, 1962

3,045,106
MOBILE WELDING APPARATUS AND METHOD
Louie W. Ballard, Santa Monica, and Martin E. O'Dor, Downey, Calif., assignors to North American Aviation, Inc.
Filed Dec. 19, 1960, Ser. No. 76,869
11 Claims. (Cl. 219—125)

This invention concerns method and apparatus for joining together two or more members by precision fusion welding therebetween, each member having a relatively thin flat portion such as a flange adapted to contact a similar portion on the other members to be joined while welding is accomplished along the distal edges of such portion. More particularly, this invention contemplates and includes a self-guided and mobile precision welder for performing welding of the type described.

The invention disclosed herein is applicable to the fabrication of any structure which requires welding members of the type stated and in the relationship referred to above. However, a particular need for this invention exists in connection with the fabrication of precipitation hardenable stainless steel sandwich type panels as used for skin surfaces on advanced triple-sonic aerial vehicles and missiles. In making such panels, thick slabs of honeycomb core material of thin metal foil are accurately cut to produce uniform thickness throughout the section, and are thereafter brazed to sheet metal top and bottom panel surfaces having a thickness on the order of .006 inch. The panels may form fuselage and airfoil surfaces in the finished vehicle, and are of extremely varied and complex form. Brazing temperatures in excess of 1600° F. are necessary to effect the stated joinder of core material and surface sheets and an inert atmosphere is required during exposure of the workpiece to these elevated brazing temperatures.

To provide the structural and environmental conditions which will result in maximum strength and accuracy of the brazed panel assembly, the panel components are placed in the desired final relationship within a retort or envelope which is then completely sealed and filled with a suitable gas such as nitrogen. Retorts of the stated type may be thin-walled stainless steel having the requisite strength at high temperatures and are often shaped or contoured as necessary to produce a panel workpiece conforming to a particular pattern or mold line. Retorts such as referred to above are characteristically formed in two or more shell-like sections, each having a flat flange extending around its entire outer surface. The retort sections are assembled around the workpiece with their peripheral flanges in continuous mating contact and are thereafter sealed together to isolate completely the workpiece from the surrounding atmosphere.

Of the various possible sealing means adaptable for use in sealing retort sections together so that gas under pressure may be introduced therein without leakage at elevated temperatures, welding is the most acceptable in that it results in positive closure of the retort joints throughout the extreme conditions referred to above. Following the brazing, heat-treating or other fabrication step, the retort sections are opened and the panel workpiece is removed therefrom.

Since retorts of the stated type are costly and difficult to replace, reuse of such items in fabricating the maximum possible number of finished panels is essential, in consideration of which the welding of such retorts to seal the same must be done at the outermost edges of the peripheral flanges thereon, permitting removal of the weld bead with a minimum of damage to or loss of retort base material when the retort is opened to remove the workpiece.

Accordingly, it is a principal object of the invention disclosed herein to provide improved apparatus for precision welding along a non-linear path accurately and rapidly.

It is a further object of this invention to provide apparatus in accordance with the above object characterized by improved compactness and lightness of weight.

Other objects and advantages will become apparent upon a close reading of the following detailed description of an illustrative embodiment of the inventive concept, reference being had to the accompanying drawings wherein.

Figures 1, 2:
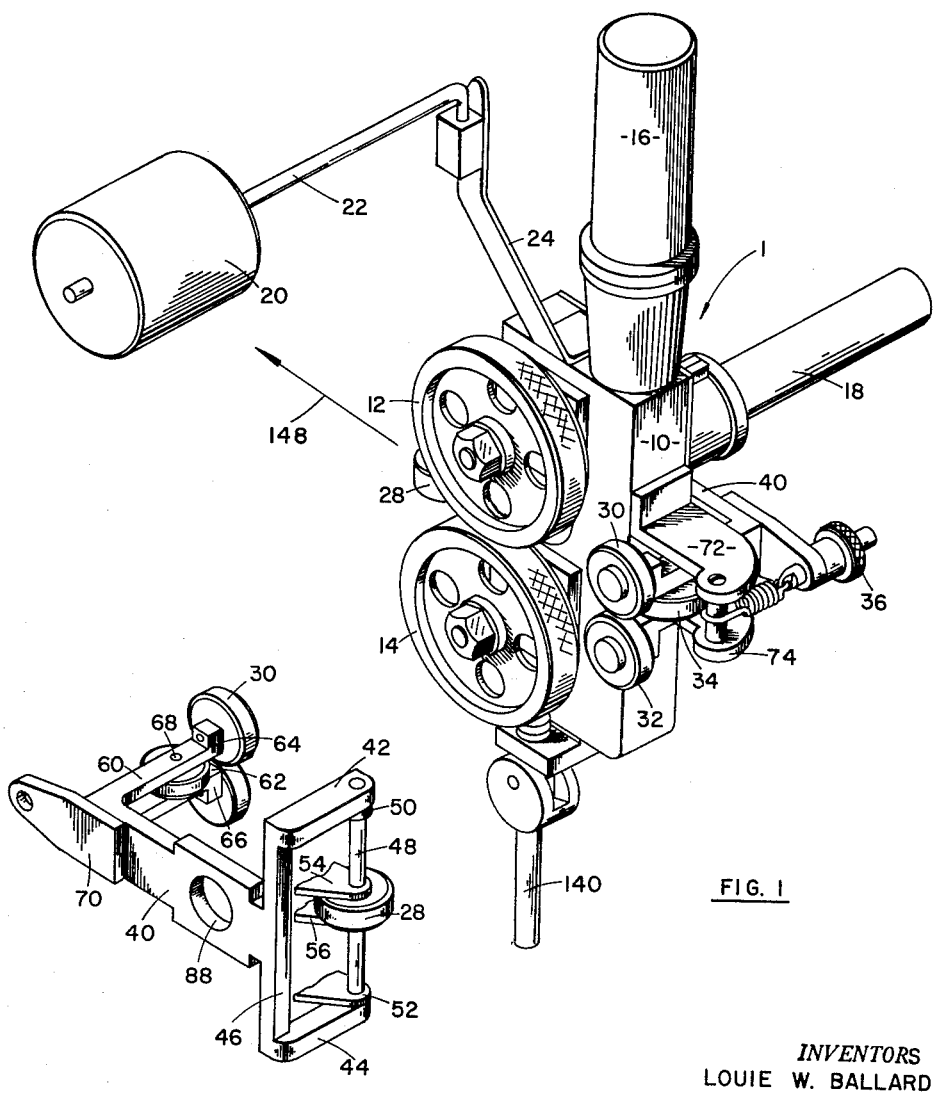
FIGURE 1 shows a general perspective view of the apparatus disclosed herein.
FIGURE 2 shows an isolated perspective view of the pivotal mount used for the guide roller chassis in the device of FIGURE 1.

With reference to the drawings described above, and particularly to FIGURE 1, the apparatus disclosed herein may be seen to include a mobile welding unit generally designated by reference numeral 1 having a frame or body 10 upon which the various elements subsequently described are mounted. Two main wheels 12 and 14 are rotatably mounted on body 10 with upper wheel 12 vertically aligned over lower wheel 14 as shown in FIGURE 1 for supporting mobile unit 1 on the distal end of a flange-like workpiece to be welded. Drive means for causing movement of unit 1 in a direction indicated by arrow 148 with respect to the stated workpiece are provided in the form of motor 16 which may be powered by electricity, air or other means and which in any case is mounted upon body 10 as shown. Also supported by body 10 and pivotally movable with respect thereto is a welding head 90, subsequently described, connected to a welding cable 18. A counterweight 20 for counterbalancing the force of gravity on mobile unit 1 and the pull of cable 18 or other forces acting on the unit is affixed to body 10 by means of a moment arm 22 connected to a bracket 24 as shown in FIGURE 1.

Movement of mobile unit 1 with respect to the workpiece upon which it may be movably supported is guided by means including forward guide roller 28 which is rotatable but otherwise fixed relative to body 10 upon which it is mounted. The guide means further includes a plurality of aft rollers comprising upper and lower vertical rollers 30 and 32, respectively, and lateral or horizontal aft guide roller 34, all of which are mounted on body 10 by means of a pivotable guide member or chassis 40 shown more particularly by FIGURE 2.

Referring now to FIGURE 2 it may be seen that chassis 40 is bifurcated at either end. Thus, for example, upper and lower portions 42 and 44, respectively, with transverse portion 46 extending therebetween are integrally formed on the forward end of chassis 40 as shown. A pivot pin 48 extending through portions 42 and 44 of chassis 40 pivotally connect the chassis to body 10 by means of upper and lower brackets 50 and 52, respectively, through which pin 48 also extends. Pin 48 also extends through forward guide roller 28 and through brackets 54 and 65 on either side thereof which are affixed to body 10 and prevent vertical movement of roller 28 in either direction with respect to the stated body.

Again referring to FIGURE 2, it may be seen that upper and lower portions 60 and 62, respectively, form the aft bifurcated end of chassis 40. Bosses 64 and 66 mounted on upper and lower portions 60 and 62, respectively, provided mounting means for aft vertical guide rollers 30 and 32 as shown. Lateral guide roller 34 is mounted between portions 60 and 62 by means of pin 68, permitting rotational movement of roller 34 and preventing relative vertical movement thereof in either direction with respect to chassis 40 or body 10.

Figure 3:
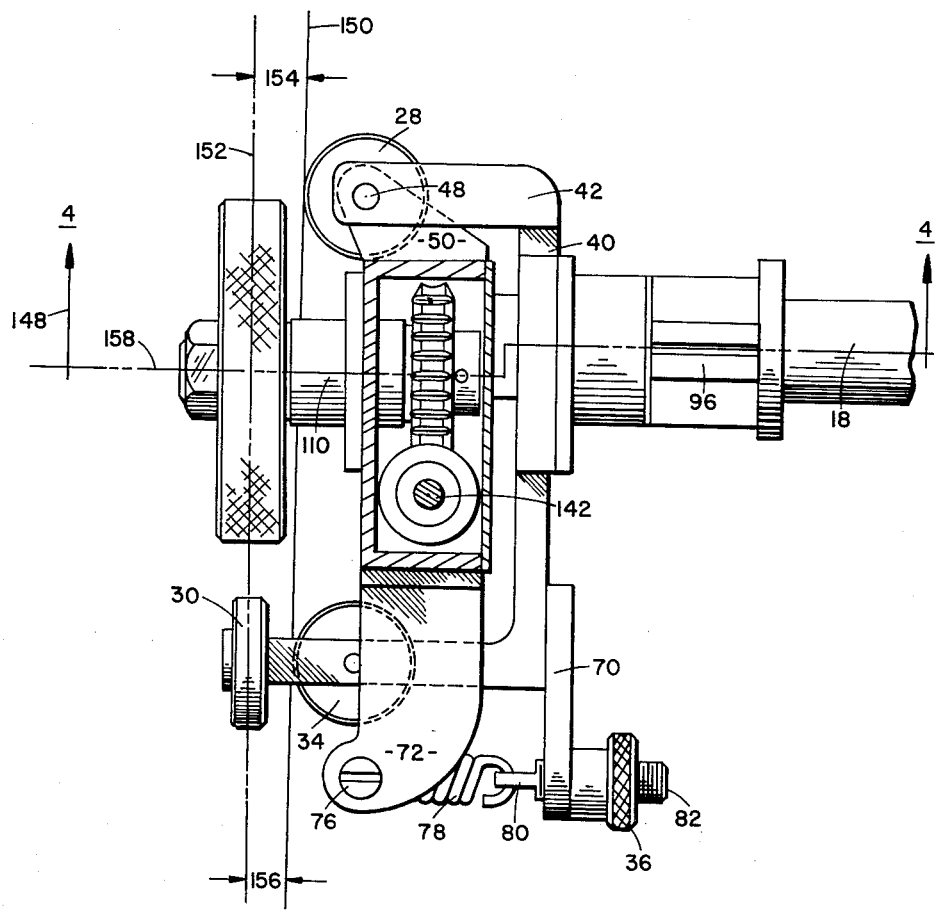
FIGURE 3 shows a plan view, partly in section, of the apparatus of FIGURE 1 seen from above, and taken along line 3—3 of FIGURE 5.

As shown by FIGURES 1 and 3, vertical movement of the aft end of chassis 40 with respect to body 10 is prevented by upper and lower brackets 72 and 74, respectively, affixed to body 10 and contacting portions 60 and 62 of chassis 40 in the manner shown. Also, a stationary pin 76 extending between brackets 72 and 74 is engaged by one end of a tension spring 78, the opposite end of which engages a lug 80 formed on the end of a screw shaft 82 extending through a projection 70 extending aft from chassis 40. The amount of tension in spring 78 tending to pull projection 70 and the aft end of chassis 40 toward pin 76 in the view shown by FIGURE 3 may be varied by means of knob 36 through the center of which a threaded hole extends and is engaged by oppositely corresponding threads on screw shaft 82.

Figure 4:
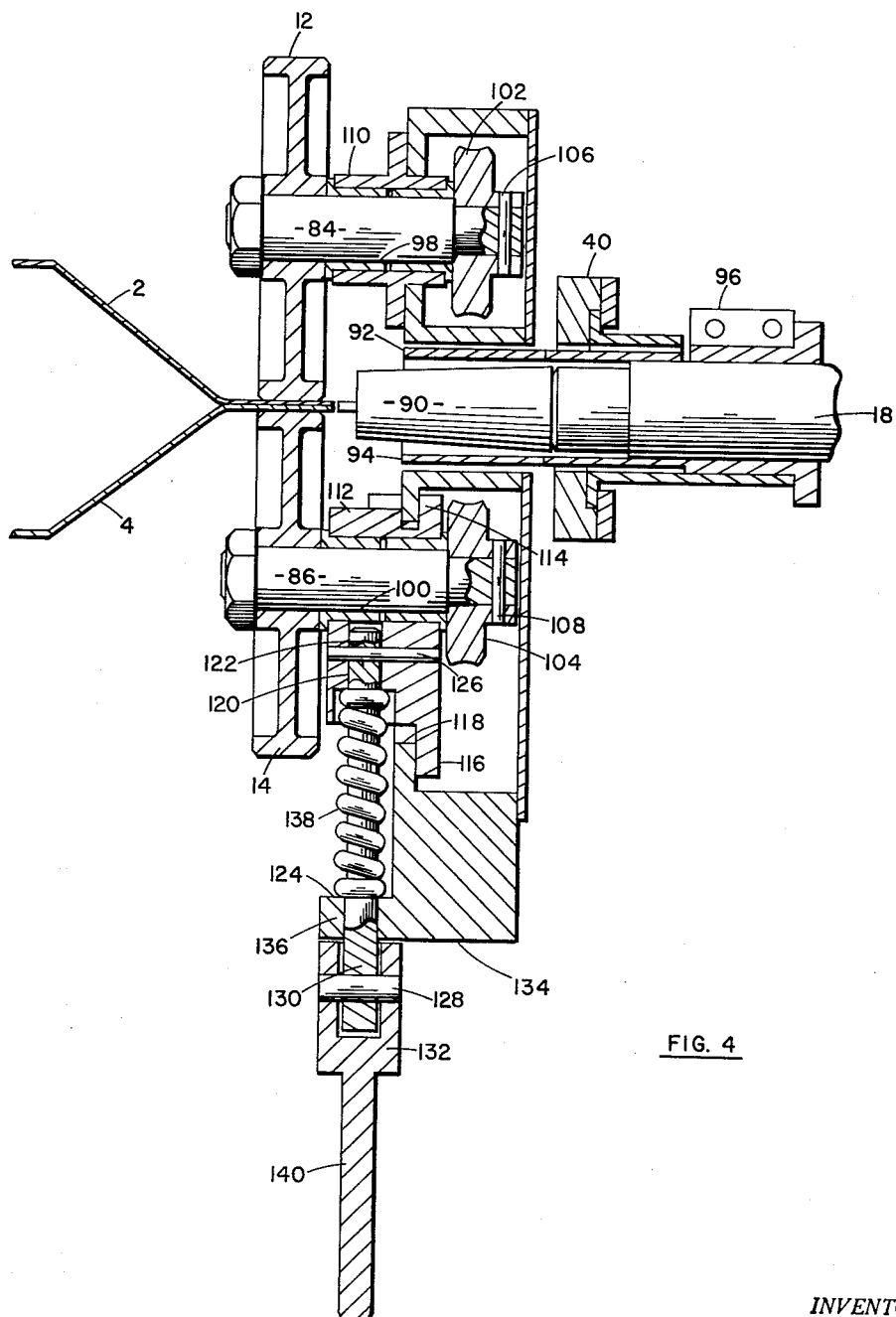
FIGURE 4 shows a cross-sectional view taken along line 4—4 of FIGURE 3.
Figure 5:
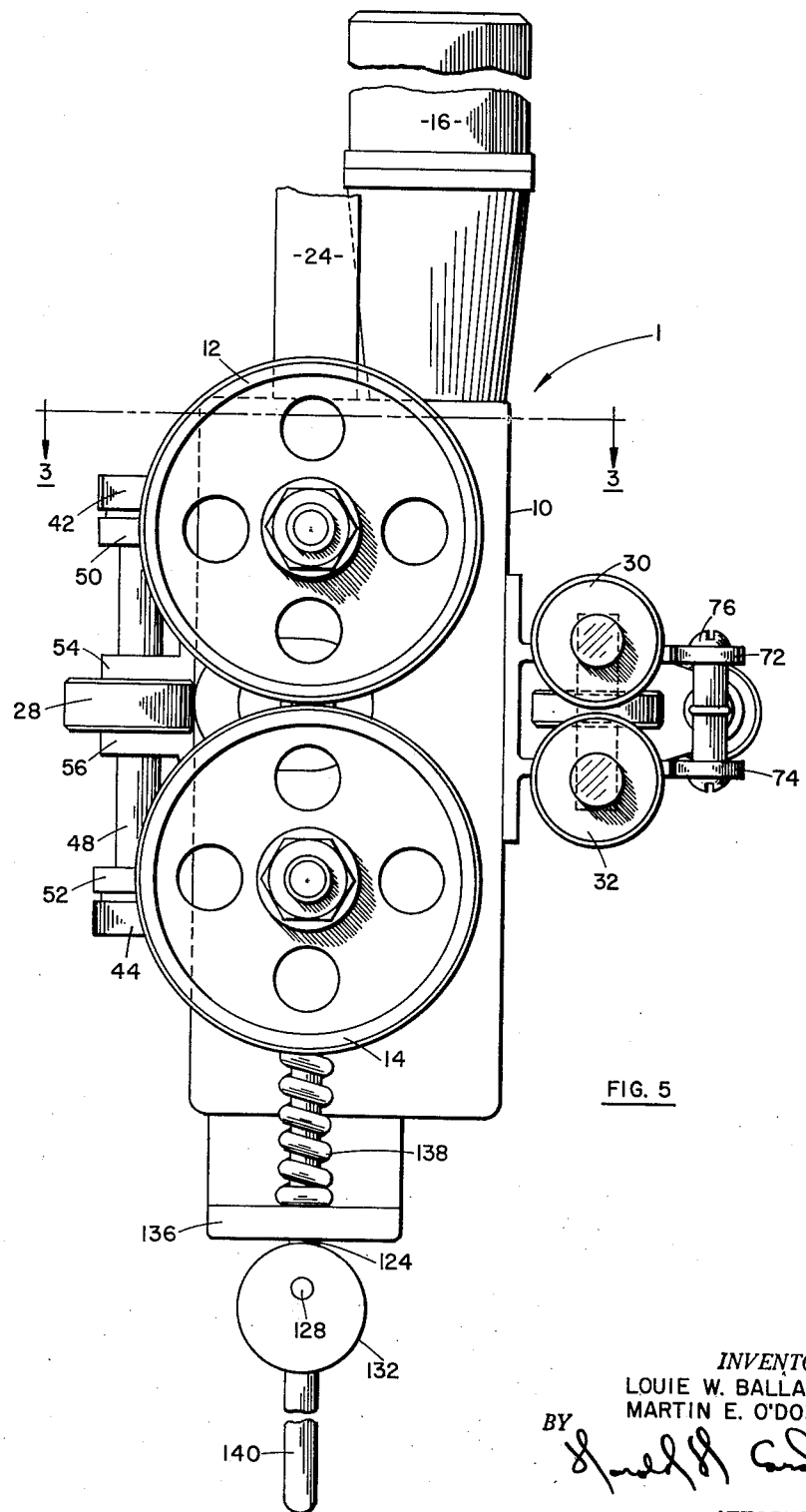
FIGURE 5 shows a side elevational view of the device shown in FIGURE 1, with portions of structure omitted for the sake of clarity.

Referring to FIGURE 4 it may be seen that welding means in the form of welding head 90 are provided, and welding head 90 is isolated from surrounding structure by suitable insulation 92 extends through a hole 94 in frame 10. Welding head 90 to which cable 18 is attached passes through a hole 88 in chassis 40 and is secured thereto by suitable clamping means such as shown at 96, with the result that welding head 90 moves in a direction and an amount depending upon movement of chassis 40. As also shown by FIGURE 4, main wheels 12 and 14 are affixed to the ends of shafts 84 and 86, respectively, each of which is rotatably journalled within wheel mounting means in the form of a suitable abrasive resistant cylindrical bearing member 98 and 100. At the ends of shafts 84 and 86 opposite from the location of wheels 12 and 14, respectively, pinions 102 and 104 are secured to each of the stated shafts by suitable means such as pins 106 and 108, respectively. Thrust bearing 110 is provided in operative relationship between rotation bearing 98 and body 10 in the manner shown, to prevent lateral movement of wheel 12 with respect to body 10 in the view shown by FIGURE 4. Lateral stability of lower main wheel 14 is accomplished in a manner similar to that described above in connection with upper wheel 12 and thrust bearing 110, except that movement of rotational bearing 100 around shaft 86 is prevented by slide plate or block 112 in which bearing 100 is mounted. Slide block 112 is provided with overlapping projects 114 and 116 which contact the inner wall surfaces of frame or body 10 around the edges of opening 118 through the stated wall as shown in FIGURE 4. Thus, the vertical position of wheel 14 relative to body 10 is adjustable due to the fact that shaft 86 within rotational bearing 100 is journalled in slide block 112 which is slidable with respect to body 10 by reason of the structural relationship therebetween. Slide block 112 is further provided with a hole 120 within which one end 122 of a rod 124 is secured by pin 126. The lower end 130 of rod 124 is flatted on each side with a pin 128 extending therebetween and further extending through a circular cam member 132. Pin 128 between rod end 130 and cam 132 is eccentrically located with respect to the circular cam so that rotation of the cam by means of handle 140 affixed thereon causes the outer periphery of the cam to bear with increasing force against surface 134 on projection 136 with which body 10 is provided at the lower end thereof. The stated force on cam 132 during rotation thereof causes downward movement of pin 128 and rod 124 which in turn causes similar movement of slide block 112 due to interengagement of the stated rod and slide block. Downward movement of slide block 112 is resisted by the force of compression spring 138 which at its upper end bears against slide block 112 and at its lower end against projection 136 on body 10.

The relationship between mobile unit 1 and retort sections 2 and 4 during welding thereof may be seen from FIGURE 4 showing the flanges of each section in uniform contact and pressed together by the force of main wheels 12 and 14. The stated relationship is also shown by FIGURE 3 wherein arrow 148 denotes the direction in which mobile unit 1 moves while welding is progressively accomplished along distal edge 150 of flanges 2 and 4. It may further be seen from FIGURE 3 that centerline 152 of main wheel 12 in the view shown is not parallel to edge 150, but instead lies at an angle resulting in a gap 154 forward of mobile unit 1 larger than gap 156 aft of the unit. The stated condition of angularity is produced by the mounting of shafts 84, 86 and wheels 12 and 14 in body 10, and the effects of this mounting arrangement upon the movements of unit 1 along edge 150. Thus, for example, when welding is accomplished along a linear edge 150 as shown in FIGURE 3, the axis of rotation 158 of wheel 12 is not quite perpendicular to the direction of travel of mobile unit 1 along edge 150, but varies from a 90° angle in the same amount as the angle between edge 150 and centerline 154. The axis of rotation of wheel 14 bears a relationship to body 10 and edge 154 identical to that described for axis 158.

*Operation*

Although the apparatus disclosed herein may be used for automatic welding of a variety of diverse materials, workpieces, and for different purposes, its operation will not in any case differ materially from the description set forth below for the sake of illustration. Operation of the apparatus may be commenced by moving handle 140 from a vertical to a horizontal position, causing rotation of cam 132 which applies downward force to connecting rod 124, moving the rod downwardly against the force of spring 138. Downward movement of rod 124 moves slide block 112 downwardly together with wheel 14 which is journalled in the stated block. Downward movement of wheel 14 separates wheel 14 from vertically immovable wheels 12, so that a flange-like surface may be moved into alignment with welding head 90 and gripped between the wheels.

With main wheels 12 and 14 separated in the manner described above, mobile unit 1 may be placed upon retort sections 2 and 4, for example, in operative relationship therewith so that lateral guide rollers 28 and 34 contact edge 150 in the manner suggested by FIGURE 3, and the flange passes between main wheels 12 and 14 and also between aft vertical guide rollers 30 and 32. While mobile unit 1 is associated with the structure to be welded in the stated relationship, handle 140 is moved toward the vertical position shown by FIGURES 1 and 4, permitting spring 138 to apply upward force on slide block 112, thus forcing wheel 14 upwardly resulting in the retort flanges being firmly gripped between wheels 12 and 14 as shown by FIGURE 4. Thereafter, motor 16 may be energized by suitable means to cause rotation of wheels 12 and 14 by suitable connections such as worm drive 142 operatively engaging pinions 102 and 104. Simultaneous with actuation of motor 16, power supplied by suitable means (not shown) through cable 18 may cause welding heat to be applied to the flanges by welding head 90.

From the description set forth above, it may be seen that actuation of mobile unit 1 in the manner stated causes movement of the unit progressively along the edges to be welded. The mounting of drive wheels 12 and 14 causes both wheels to toe inwardly with respect to edge 150, resulting in a crabbing action of the wheels during their rotation which tends to pull body 10 toward the left as seen in FIGURE 3 forcing rollers 28 and 34 into close contact against edge 150. If for any reason wheels 12 and 14 are caused to alter their path so that centerline 152, for example, moves in a direction to decrease gap 154 with corresponding movement of body 10, edge 150 will apply increasing force against aft lateral roller 34 tending to move the roller toward the right as seen in FIGURE 3. Movement of roller 34 toward the right is necessarily accompanied by movement of chassis 40 in a counter-clockwise direction about pivot pin 48. Pivotal movement of chassis 40 in the stated direction is resisted by tension spring 78 which applies a moment of force to chassis 40 in a direction of rotation opposite to that applied by edge 150. Thus, for example, any change in the angularity between edge 150 and centerline 152 has an effect upon aft lateral roller 134 which produces either an increasing or a decreasing corrective force exerted by spring 78 acting upon spring arm 70 of chassis 40 to oppose or correct the disturbing force which produced lateral movement of roller 34. The precise relationship between edge 150 and centerline 152 may be varied by adjustment of screw 36 to establish a particular amount of initial force from spring 78 tending to resist movement of the aft end of chassis 40 toward the right in FIGURE 3 due to reaction force applied by edge 150 against roller 34, although it will be seen that in any case, the direction of movement of mobile unit 1 is always identical with the shape of edge 150. The crabbing action of wheels 12 and 14, and its effect upon mobile unit 1 during movement thereof along edge 150 tends to hold unit 1 in proper welding position on the flange-like structure to be welded so that the unit closely and automatically follows the shape of the edge throughout curves and other variations thereof.

Moreover, since cable 18 is secured by appropriate means including clamp 96 to chassis 40, pivotal movement of the chassis around pin 48 necessarily alters the lateral direction of welding head 90 which is free to move slightly within hole 94 through body 10. In the stated manner, the angularity of welding head 90 with respect to edge 150 as initially adjusted is preserved and maintained by movement of chassis 40 about pivot pin 48 to compensate for any movement of wheels 12 and 14 with respect to the workpiece which otherwise would disturb the relationship necessary for accurate welding by welding head 90. Thus, when secured at any point to a flange of the general type described above, the apparatus disclosed herein will automatically proceed along the flange upon operation of drive motor 16 and continually guide itself to position welding head 90 as necessary to precision weld the flange edge progressively throughout the entire periphery of the object to which the device is secured.

While the particular structural details set forth above and in the drawings are fully capable of attaining the objects and providing the advantages herein stated, the structure thus disclosed is merely illustrative and could be varied or modified to produce the same results without departing from the scope of the inventive concept as defined in the appended claims.

We claim:

1. A mobile device for welding progressively and automatically along a distal edge of flange-like structure, including in combination; welding means for applying heat to said edge for welding the material therein, frame means for supporting said welding means in operative relationship with said edge, wheel mounting means for rotatably mounting a plurality of wheels on said frame, a plurality of wheels rotatably mounted by said wheel mounting means on said frame means so that compressive force is applied on either side of said flange-like structure, said wheels supporting said mobile device entirely on said flange-like structure, drive means connected to at least one of said wheels to rotate the same and thereby cause movement of said mobile device along said edge, and guide means for guiding said mobile device along a path of travel corresponding to the shape of said edge during movement of said device therealong.

2. The structure set forth in claim 1 above wherein said guide means includes chassis means pivotally connected to said frame means and a plurality of guide rollers rotatably mounted on said chassis means for rolling contact with said flange-like structure.

3. The structure set forth in claim 2 above wherein said chassis means includes clamping means for supporting said welding head on said chassis means whereby pivoting movement of said chassis means with respect to said frame means causes corresponding movement of said welding head.

4. In a mobile device for welding progressively and automatically along a distal edge of flange-like structure, welding means for applying heat to said edge for welding the material therein, frame means for supporting said welding means in operative relationship with said edge, wheel mounting means for rotatably mounting a plurality of wheels on said frame including sliding block means slidably mounted on said frame means for movement relative thereto, a plurality of wheels rotatably mounted by said wheel mounting means on said frame means so that compressive force is applied on either side of said flange-like structure, said wheels supporting said mobile device entirely on said flange-like structure, adjusting means for adjusting the relative position of said slide block means with respect to said frame means whereby said compressive force may be varied for adjustment of said wheels on said flange-like structure, drive means connected to at least one of said wheels to rotate the same and thereby cause movement of said mobile device along said edge, and guide means for guiding said mobile device along a path of travel corresponding to the shape of said edge during movement of said device therealong.

5. The structure set forth in claim 4 above wherein said guide means includes chassis means pivotally connected to said frame means and a plurality of guide rollers rotatably mounted on said chassis means for rolling contact with said flange-like structure, said chassis means including clamping means for supporting said welding head on said chassis means whereby pivoting movement of said chassis means with respect to said frame means causes corresponding movement of said welding head.

6. In a mobile device for welding progressively and automatically along a distal edge of flange-like structure, welding means for applying heat to said edge for welding the material therein, frame means for supporting said welding means in operative relationship with said edge, wheel mounting means for rotatably mounting a plurality of wheels on said frame whereby the axes of rotation of said wheels is oblique to the direction of travel of said device during said progressive welding, a plurality of wheels rotatably mounted by said wheel mounting means on said frame means so that compressive force is applied on either side of said flange-like structure, drive means connected to at least one of said wheels to rotate the same and thereby cause movement of said mobile device along said edge, and guide means for guiding said mobile device along a path of travel corresponding to the shape of said edge during movement of said device therealong.

7. The structure set forth in claim 6 above wherein said guide means includes chassis means pivotally connected to said frame means and a plurality of guide rollers rotatably mounted on said chassis means for rolling contact with said flange-like structure, said chassis means including clamping means for supporting said welding head on said chassis means whereby pivoting movement of said chassis means with respect to said frame means causes corresponding movement of said welding head.

8. The structure set forth in claim 7 above including in addition thereto, resilient force means connected to said chassis means whereby force is applied to said chassis means to resist the action of said wheels tending to pull said frame means closer against said edge during movement therealong due to said oblique mounting of said wheels.

9. The structure set forth in claim 8 above wherein said welding means includes an electric powered arc welding head and said drive means includes a motor mounted on said frame means and connected to rotate a worm gear, and two pinions each of which is engaged by one of said worm gears.

10. A mobile device for welding progressively and automatically along a distal edge of flange-like structure, including in combination; an arc type welding head for applying heat to said edge for welding the material therein, a hollow body member having a hole therein through which said welding head is adapted to pass, a plate slidably engaging the surface of said body member and vertically movable with respect thereto, a first generally cylindrical shaped bearing element affixed to said body member, a second generally cylindrical shaped bearing element affixed to said plate and vertically aligned with respect to said first bearing element, a first main wheel secured to a shaft rotatably journalled within said first bearing element, a second main wheel secured to a shaft rotatably journalled within said second bearing element, resilient means extending between said body member and said plate tending to move said plate in a direction whereby said second main wheel is moved toward said first main wheel so that compressive force is applied by both said wheels to said flange-like structure situated between the said main wheels, a drive motor mounted on said body member and drivably engaging said first main wheel shaft and said second main wheel shaft to rotate the same and thereby cause movement of said mobile device along said flange-like structure, a chassis pivotally mounted on said body member at the forward end of said chassis with respect to the direction of said movement of said mobile device, a pivot pin connecting said chassis to said body member at the forward end of said body member, a forward guide roller mounted on said body member and rotatably journalled on said pivot pin, a plurality of aft guide rollers rotatably mounted on said chassis at the aft end thereof, said first and second bearing elements being aligned so that the axes of rotation of said first and second wheels and shaft lie in a common plane oblique to the direction of travel of said mobile device whereby said first and second main wheels continually slip during rolling contact along said flange-like structure and continually pull said mobile device closer against said distal edge, and a tension spring connected between said body member and the aft end of said chassis whereby force is applied to said chassis tending to resist the action of said first and second main wheels tending to pull said mobile device closer against said distal edge during movement therealong.

11. A method of automatically welding a first flange-like portion of structure to a second flange-like portion of structure at the outermost portion of the distal edges thereof, said method comprising placing said first and second portions in close juxtaposition with the edges to be welded adjacent each other, applying welding heat to said edges progressively along a path of travel dependent upon the shape of said edges, simultaneously applying compressive force on said first and second portions to force said edges together at the place where said welding heat is applied, and automatically controlling the location of said welding heat and said compressive force so that said path of travel coincides with the shape of said edges.

References Cited in the file of this patent

UNITED STATES PATENTS

| | | |
|---|---|---|
| 1,637,031 | Tobey | July 26, 1927 |
| 2,095,295 | Smith et al. | Oct. 12, 1937 |
| 2,227,249 | Ganahl | Dec. 31, 1940 |
| 2,510,083 | Davis et al. | June 6, 1950 |